No. 720,500. PATENTED FEB. 10, 1903.
W. T. SPILLANE.
SHOVEL ATTACHMENT.
APPLICATION FILED MAY 31, 1902.
NO MODEL.
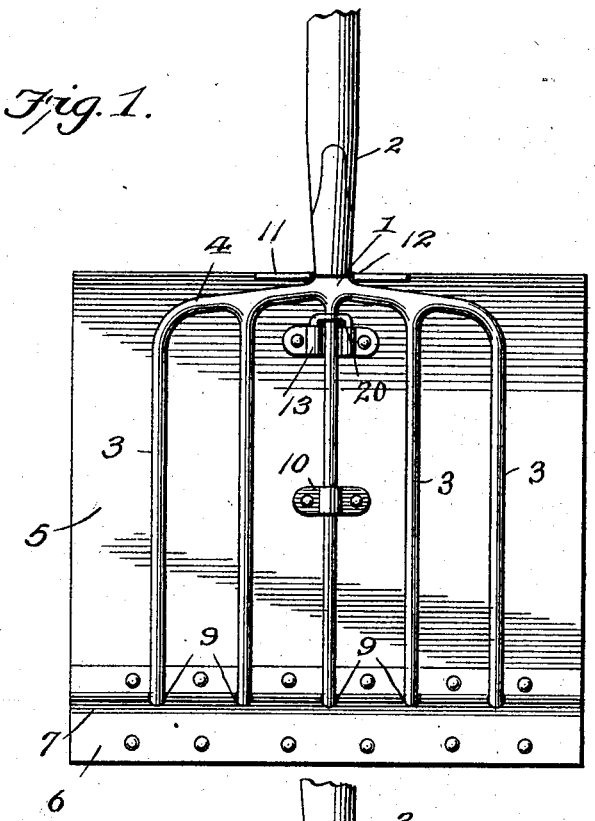
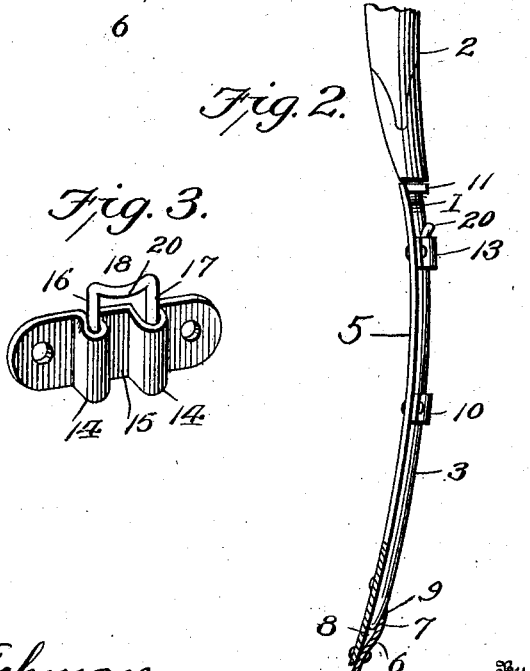
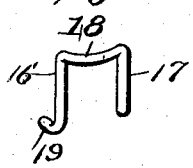
Witnesses
Geo. Ackman.
Chas. S. Hyer.
Inventor
William T. Spillane,
By Victor J. Evans
Attorney

UNITED STATES PATENT OFFICE.

WILLIAM T. SPILLANE, OF REDLAKE FALLS, MINNESOTA.

SHOVEL ATTACHMENT.

SPECIFICATION forming part of Letters Patent No. 720,500, dated February 10, 1903.

Application filed May 31, 1902. Serial No. 109,686. (No model.)

*To all whom it may concern:*

Be it known that I, WILLIAM T. SPILLANE, a citizen of the United States, residing at Redlake Falls, in the county of Red Lake and State of Minnesota, have invented new and useful Improvements in Shovel Attachments, of which the following is a specification.

This invention relates to a shovel attachment for forks and the like; and the main object of the same is to provide a simple and effective device of this class which is adapted to be applied to a fork having any number of tines to quickly convert the fork into a flat shovel or scoop and to protect or cover the points of the tines, the attachment having features of construction which operate to firmly hold it to the fork tines and head and quickly operative to permit the attachment to be separated from the fork when it is desired to use the latter alone.

The invention consists in the construction and arrangement of the several parts, which will be more fully hereinafter described and claimed.

In the drawings, Figure 1 is a rear elevation of a fork having the handle broken away and showing the improved attachment applied thereto. Fig. 2 is an edge elevation of the device, as shown by Fig. 1, the shovel attachment being partially broken away at its lower end. Fig. 3 is a detail perspective view, on an enlarged scale, of a clip-securing device attached to the rear side of the upper portion of the shovel attachment for engaging the central tine of the fork. Fig. 4 is a detail perspective view of a movable clasp used in the clip shown by Fig. 3.

Similar numerals of reference are employed to indicate corresponding parts in the several views.

The numeral 1 designates a fork of any ordinary form of construction, having a handle 2 and a series of tines 3 extending from a head 4.

The improved attachment comprises a substantially rectangular strip 5, of sheet-iron or other suitable sheet metal, which is longitudinally bowed and has the lower end provided with a reinforcing-strip 6, secured to the rear side by suitable rivets and extending the full transverse width of the attachment. The strip 6 is fastened adjacent to its upper and lower edges and at an intermediate point is struck outwardly or rearwardly, as at 7, to form a pocket 8, having a plurality of apertures 9 for the removable insertion into the said pocket of the points of the tines 3. The strip 6 strengthens the lower end of the shovel attachment and gives it more body for effectiveness in performing the shoveling operation. On the rear side or face of the shovel attachment a clip 10 is secured and centrally located and is disposed in alinement with the longitudinal center of the attachment to permit the central tine 3 of the fork to pass therethrough and serve as an auxiliary holding and supporting means for said attachment. At the center the upper edge of the attachment has a pair of flanges 11, projecting rearwardly at an angle and separated by an intervening seat-recess 12, into which the lower portion of the handle 2 is adapted to be placed when the attachment is applied to the fork. The seat-recess 12 is in alinement with the clip 10, and between the said recess and the clip is a fastening device 13, consisting of a metallic strip secured at opposite ends and having two rearwardly-projecting guides or barrels 14, with a seat 15 between them. Slidingly mounted in the guides or barrels 14 are the opposite legs 16 and 17 of a securing-clasp 18, the said legs 16 and 17 being freely slidable in the guides or barrels 14 and the leg 16 terminally formed with a hook or angular stop projection 19 to prevent disengagement thereof from its guide or barrel. The leg 17 is considerably shorter than the leg 16, and to open the clasp it is bodily pushed upwardly until the leg 17 clears the upper end of its guide or barrel 14, when the entire clasp may be thrown over to permit the central tine 3 of a fork to be disposed in the seat 15. The leg 16 serves as a pivot or fulcrum for the clasp, and the head 20 of the latter is bowed rearwardly to correspond to the curvature of the central tine 3. After this tine has been disposed in the seat 15 the clasp is turned back to its normal position over the tine and the leg 17 alined with the upper entrance to guide or barrel 14, when the entire clasp is shoved downwardly, thereby securely locking the central tine to the shovel attachment.

In applying the attachment to the fork the tines of the latter are slipped downwardly close to the back of the attachment, the central tine being pushed through the clip 10 and the forward or lower extremity of all the tines inserted in the apertures or openings 9, it being understood that the clasp 18 will be first opened, so as to clear the seat 15. The head 4 of the fork is then brought in close bearing relation to the upper portion of the attachment below the flanges 11, or so that the lower terminal of the handle will enter the seat-recess 12 and the upper part of the central tine of the fork will become disposed in the seat 15. After this arrangement of the fork and attachment the clasp 18 is then closed over the central tine of the fork and the legs 16 and 17 pushed downwardly through the guides or barrels 14. The attachment may be quickly disengaged from the fork by releasing the clasp 18 and drawing the fork-tines upwardly from and out of engagement with the clip 10 and apertures or openings 9 after the head 4 of the fork has been pushed back far enough to clear the flanges 11.

From the foregoing it will be seen that an effective securing means for holding the shovel attachment in connection with the fork is provided, and the fork is not in the least injured by its use with the attachment, nor does the latter require a specially-formed fork to produce a practical shovel or scoop. The longitudinally-bowed shape of the attachment is intended to conform to the similar bow of the fork-tines. This is also essential in rendering the fastening device effective and permits the use of a reduced number of said fastenings to render the application of the attachment positive.

Having thus fully described the invention, what is claimed as new is—

1. The combination with a fork, of a removable shovel attachment comprising a strip of sheet metal having a lower reinforcing-strip on the rear side shaped to form a pocket and having openings therein for receiving and inclosing the extremities of the fork-tines, a center clip through which the center tine is adapted to be passed, and a clasp engaging the upper portion of the center clip.

2. The combination with a fork, of a removable shovel attachment having a pocket on the rear side of the lower end thereof with openings leading thereto to removably receive the free ends of the fork-tines, the upper end of the attachment having rearwardly-projecting flanges with a seat-recess between them, and fastening means to engage the upper part of the central tine comprising a slidable and rotatable clasp, and a clip through which the central tine is passed.

3. The combination with a fork, of a removable shovel attachment having means for engaging the free ends of the fork-tines, and a fastening means for the central tine including a slidable and rotatable clasp, and a seat to receive said tines.

4. The combination with a fork, of a removable shovel attachment having means at the lower end and on the rear side for removably receiving the free ends of the forked tines, and fastening means for engaging the upper portion of the central tine, and consisting of a metal strip having a central seat and rearwardly-extending guides with a clasp slidably and rotatably mounted therein.

In testimony whereof I affix my signature in presence of two witnesses.

WILLIAM T. SPILLANE.

Witnesses:
F. A. GRADY,
E. A. MORAN.